US011954618B2

(12) United States Patent
Haldar et al.

(10) Patent No.: US 11,954,618 B2
(45) Date of Patent: Apr. 9, 2024

(54) SKILLSET SCORING AND EXTRACTION ENGINE

(71) Applicant: Microsoft Technology Licensing, LLC, Redmond, WA (US)

(72) Inventors: Abhijeet Haldar, Hyderabad (IN); Anuj Jain, Hyderabad (IN); Imran Siddique, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/888,495

(22) Filed: May 29, 2020

(65) Prior Publication Data

US 2021/0374649 A1  Dec. 2, 2021

(51) Int. Cl.
*G06Q 10/0631* (2023.01)

(52) U.S. Cl.
CPC .......................... *G06Q 10/063112* (2013.01)

(58) Field of Classification Search
None
See application file for complete search history.

(56) References Cited

U.S. PATENT DOCUMENTS

| 8,639,547 | B1* | 1/2014 | Judy | G06Q 10/105 |
| | | | | 705/7.11 |
| 2005/0021383 | A1* | 1/2005 | Fliess | G06Q 10/063112 |
| | | | | 705/7.14 |
| 2008/0086366 | A1* | 4/2008 | Concordia | G06Q 10/06 |
| | | | | 434/219 |
| 2013/0018686 | A1* | 1/2013 | Wright | G06Q 10/063112 |
| | | | | 705/7.14 |
| 2014/0324721 | A1* | 10/2014 | Rennison | G06Q 50/2057 |
| | | | | 705/321 |

(Continued)

FOREIGN PATENT DOCUMENTS

| WO | WO-2015084404 | A1 * | 6/2015 | ....... G06F 16/24578 |
| WO | WO-2016018470 | A1 * | 2/2016 | ......... G06Q 30/0201 |
| WO | WO-2018209254 | A1 * | 11/2018 | ......... G06F 16/9535 |

OTHER PUBLICATIONS

Wei, Dennis, Kush R. Varshney, and Marcy Wagman. "Optigrow: People analytics for job transfers." 2015 IEEE International Congress on Big Data. IEEE, 2015. (Year: 2015).*

(Continued)

*Primary Examiner* — Thomas L Mansfield

(57) ABSTRACT

Methods and systems are provided that are directed to identifying an individual having a specific skill and that is best suited for performing a particular task. The individual may be identified based on having a highest score for the skill out of a pool of individuals having the same skill. In examples, a score specific to each individual out of the pool of individuals having the same skill may be based on multiple interactions with the skill and may be adjusted based on a recency of when each interaction occurred and a level of involvement the individual had with the skill. Accordingly, individuals having recent experience with the skill may be scored, and therefore, ranked higher than individuals having experience with the skill that may have occurred further back in time. In examples, the information about the skills and experiences may be utilized to automatically generate the score.

12 Claims, 12 Drawing Sheets

(56) References Cited

U.S. PATENT DOCUMENTS

| | | | | |
|---|---|---|---|---|
| 2016/0196336 A1* | 7/2016 | Allen | .................. | G06F 16/9535 |
| | | | | 707/722 |
| 2018/0096306 A1* | 4/2018 | Wang | ..................... | G06Q 50/01 |
| 2018/0150739 A1* | 5/2018 | Wu | ........................ | G06N 20/10 |
| 2018/0330331 A1* | 11/2018 | Nair | .................. | G06Q 10/1053 |
| 2019/0347668 A1* | 11/2019 | Williams | ............ | H04L 67/2833 |
| 2020/0065857 A1* | 2/2020 | Lagi | .................... | G06F 16/9535 |
| 2021/0357378 A1* | 11/2021 | Urdiales | ............... | G06F 16/215 |

OTHER PUBLICATIONS

Pretz, Jean E., and Kathryn Sentman Totz. "Measuring individual differences in affective, heuristic, and holistic intuition." Personality and Individual differences 43.5 (2007): 1247-1257. (Year: 2007).*

Jablokow, Kathryn, et al. "Ideation variety in mechanical design: Examining the effects of cognitive style and design heuristics." International Design Engineering Technical Conferences and Computers and Information in Engineering Conference. vol. 57106. American Society of Mechanical Engineers, 2015. (Year: 2015).*

* cited by examiner

SKILLSET SCORING AND EXTRACTION ENGINE

BACKGROUND

Identifying an individual best suited for performing a particular task is difficult, especially when identifying individuals who satisfy very specific criteria. Further, as assessment criteria may be undefined and mostly subjective, an individual's ability to judge the strength of their own skills against others possessing the same or similar skill furthers the difficultly for identifying the skill and articulating skill strength. For example, in the software development industry, most developers work on different technologies over long periods of time and their resumes become out of date. Previously, it was possible to articulate what a developer knew and the strength of the developer in a particular knowledge domain, in part, because there were only limited programming languages. A shift in technology and a rise in complexity has pushed developers to specialize in one area or maintain a general less specialized understanding in many areas. Accordingly, while a developer may have knowledge of a particular programming language or topic because they worked in that area years ago, their actual strength in the particular programming language or topic would be less than an individual who is currently practicing the particular programming language or topic. Regardless of industry, assumptions and personal beliefs often cloud the ability of an individual to provide an accurate assessment of their strength in a particular area. Accordingly, identifying the right individual for performing a particular task at a particular point in time is difficult.

SUMMARY

In accordance with examples of the present disclosure, methods and systems are provided that are directed to identifying an individual having a specific skill and that is best suited for performing a particular task. More specifically, one or more skills possessed by an individual may be identified based on actual work items. For example, as an individual interacts with a content source system, skills associated with the interaction may be identified and a score for the identified skill specific to the individual may be generated. In some examples, the score for the individual may allow the individual to be ranked against other individuals, or a pool of individuals, possessing the same skill. The score may also reflect or otherwise take into account an amount of time that passes between when an individual interacted with the work item and when the score is generated. Accordingly, not only is the score indicative of an amount or quantity of interactions for which the individual may have interacted with the work item, but the score also reflects "freshness" of a skill; that is, a score may be higher if the score is based on more recent interactions with work items. Further, as skills are identified from information associated with a content source, each skill, no matter how specific, may be associated with an individual. Accordingly, in addition to identifying and ranking general skills, skills that would otherwise go unnoticed, such as a specific skill or skill set, may be extracted and available for ranking.

In accordance with examples of the present disclosure, a method for extracting skills from information in a content source and ranking individuals based on the extracted skills is provided. The method may include receiving information from a content source, associating a keyword to a portion of the received information, wherein the keyword is indicative of at least one skill, associating one or more individuals to the keyword based on the one or more individuals having interacted with the respective associated portion of received information, for each individual of the one or more individuals, generating a keyword score based on a summation of one or more instances of the individual being associated with the keyword and a normalization of the summation over a plurality of individuals associated with the keyword, and storing each keyword score associated with each individual and each keyword in a traversable graph, the traversable graph linking each individual of the one or more individuals to each keyword based on the keyword score.

In accordance with examples of the present disclosure, a system for ranking individuals based on a skill identified in a content source is provided. The system may include a processor memory including instructions which when executed by the processor, causes the processor to receive information from a content source, the content source including a work item associated with a plurality of individuals, classify a portion of the work item based on one or more keywords, wherein the one or more keywords are indicative of at least one skill, for each individual of the plurality of individuals, generate a score associated with the keyword based on a summation of one or more instances of the individual being associated with the keyword and a normalization of the summation over a group of individuals being associated with the keyword, store each keyword score associated with each individual and each keyword in a traversable graph, the traversable graph linking each individual of the one or more individuals to each keyword based on the keyword score, traverse the graph based on a keyword and keyword score, and provide a score associated with one or more of the plurality of individuals to a display of a computing device.

In accordance with examples of the present disclosure, a method for extracting a skill from information in a content source and ranking an individual against other individuals possessing the skill is provided. The method may include receiving information from a content source, converting the received information into a structured format, applying one or more classifiers to the information in the structured format, the one or more classifiers identifying a portion of the structured format as being associated with a skill, associating an individual with the skill based on the interaction of the individual with the portion of the structured format, scoring an individual based on the individual's interactions with the skill and other individuals' interactions with the skill, storing the score associated with the individual and each skill in a traversable graph, the traversable graph linking the individual to the skill based on the score, and providing the score associated with the individual to a user interface of a display device.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1:
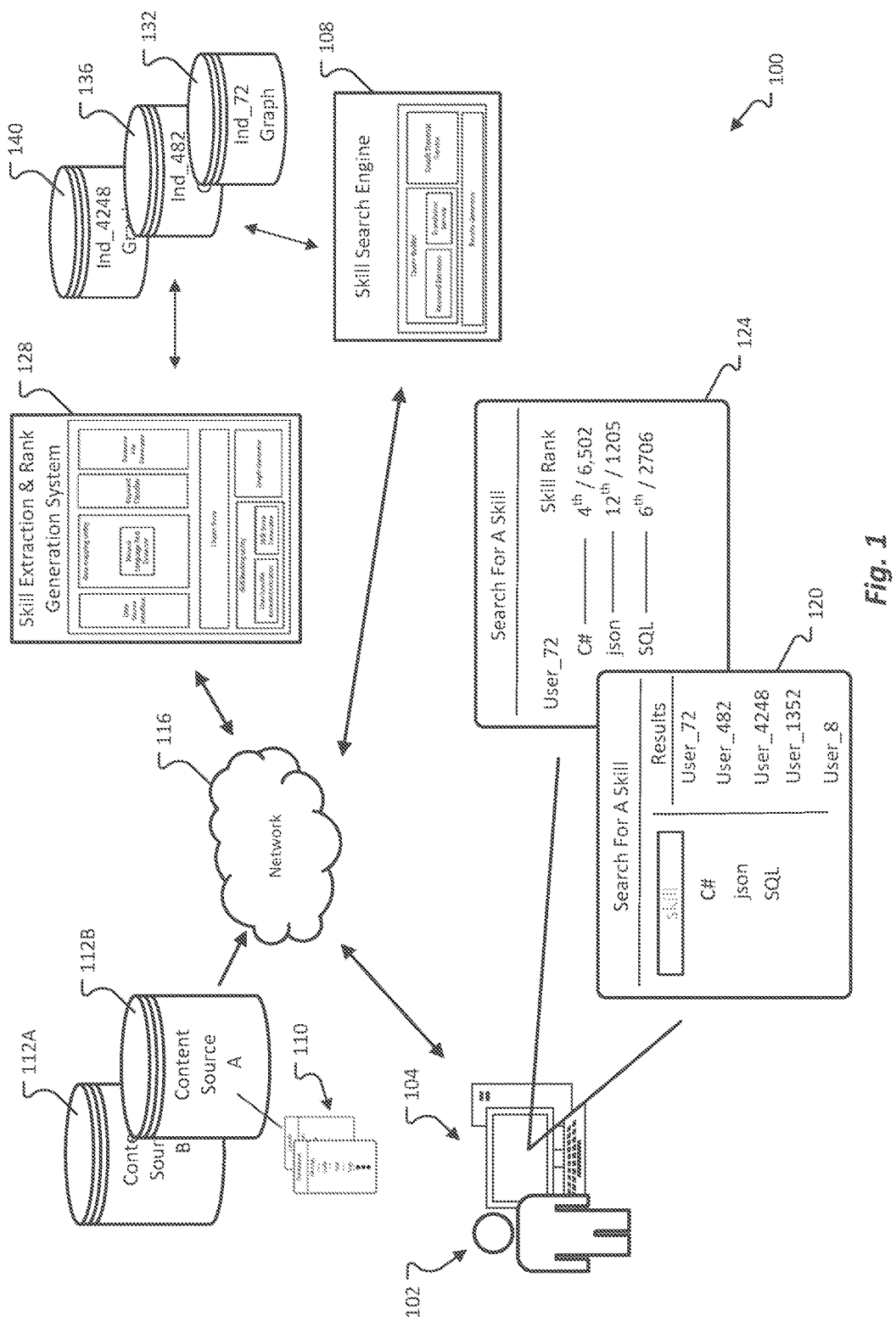
FIG. 1 depicts details of an autonomous inherent skillset comparative scoring and extraction system in accordance with examples of the present disclosure.

FIG. 1 depicts details of an autonomous inherent skillset comparative scoring and extraction system 100 in accordance with examples of the present disclosure. A user 102 may interact with an app, web application, or other user interface at a display device of a computing system 104 to identify one or more individuals possessing or otherwise having exhibited a specific skill or specific skill set. Skills and skillsets may be extracted from one or more content repositories 112A-112B. A content source 112A-112B may correspond to a work product content repository storing or otherwise making accessible work products associated with one or more individuals. As one non-limiting example, one or more of the content sources 112A-112B may correspond to a version control repository for software such as, but not limited to, GitHub® In some examples, a content source may correspond to a real-term data source, such as text, or other signals, from a chat session, or email. Accordingly, pull requests, commits, and comments, associated with an individual may be stored in the content repositories 112A-112B as an item 110. In some examples, the content source 112A may be different from the content source 112B. For example, the content source 112A may be associated with a version control repository for software whereas the content source 112B may be associated with a knowledge bank, skill testing repository, education repository, information from a real-time chat, and/or internal repository specific to a technology or company, etc.

A skill extraction and rank generation system 128 may access and parse one or more items 110 in the content repositories 112A-112B and classify, based on keyword identification, one or more aspects of the item 110 contained in the content repositories 112A-112B as a skill. For example, a pull request may correspond to the item 110 contained in the content source 112A. A pull request may include various sections, such as but not limited to, a comment section, a code section, a testing section, etc. An individual may author a code section of the pull request, such code section may be written utilizing C#. The skill extraction and rank generation system 128 may parse the code section of the pull request and classify the pull request as a C# skill. In some examples, the classification of the pull request and therefore the skill, may be based on one or more predetermined keywords. For example, if the code section of the pull request includes one or more C# commands, the skill extraction and rank generation system 128 may classify the pull request as a C# skill. In some examples, the item contained in the content repositories 112A-112B may be classified as an item containing multiple skills. Continuing with the above example, if the code section of the pull request was written in C# and the comment section of the pull request indicated that a particular software architecture was utilized, such as updating the model of a model-view-controller, the skill extraction and rank generation system 128 may parse the comment section and code section of the pull request and classify the pull request as a C# skill, as a model skill, and/or more broadly as a model-view-controller skill.

Once the skill extraction and rank generation system 128 has parsed at least a portion of the content source, the skill extraction and rank generation system 128 may generate a graph specific to a particular individual. The graph may be utilized to store an association between a particular skill and the individual. For example, a graph 132 may be specific to Individual _72 and may associate skills associated with items 110 in the content source to Individual _72. A graph 136 may be specific to Individual _482 and may associate skills associated with items 110 in the content source to Individual _482. A graph 140 may be specific to Individual _4248 and may associate skills associated with items 110 in the content source to Individual _4248. Each of the graphs 132, 136, and 140 may have overlapping technology such that multiple individuals may be associated with a same skill.

The skill extraction and rank generation system 128 may then generate a score or otherwise rank each skill associated with an individual such that individuals associated with a particular skill are ranked in comparison to one another. That is, the skill extraction and rank generation system 128 may sum or otherwise combine all instances of a skill associated with an individual to arrive at an unscaled individual skill score. For example, an individual may have authored multiple commits, pull requests, and iterations over multiple projects. Some of the pull requests, commits, and iterations may be associated with the same skill, such as C#. The skill extraction and rank generation system 128 may sum or otherwise combine the instances of the pull requests, commits, and iterations involving the skill C# to arrive at an unscaled individual skill score. All individuals may then be scored and ranked relative to each other, where each addition or subtraction of an individual impacts the overall skill ranking for each individual. Further, because the individuals are scored and ranked with respect to one another, a change to one individual's score generally results in a change to all individual's score for that same skill. In some examples, recency and/or a time attribute, such as time/date associated with a skill or a number of days since the skill has been performed as evidenced by a check-in date for example, may be utilized to reduce the contribution of an instance of skill to the individual's overall skill score. As one example, a first pull request that is more recent in time may contribute more to a individual's score or ranking than a second pull request less recent in time. The skill extraction and rank generation system 128 may then store the individual's score for each keyword classified skill in a graph.

Accordingly, when a user 102 provides or otherwise specifies a criteria, such as one or more skills by keyword as depicted in the user interface 120, the specified keyword criteria may be transmitted to the skill search engine 108 via the network 116. The skill search engine 108 may generate a query based on the received user supplied keywords and provide an indication of the top ranked, or top scored, individuals that possess or otherwise have demonstrated the one or more skills specified by the user. In some instances, the user 102 may view individual ranking information for a particular individual by selecting an individual from the results list in the user interface 120. Such ranking information may be displayed utilizing the user interface 124 for example.

Figure 2:
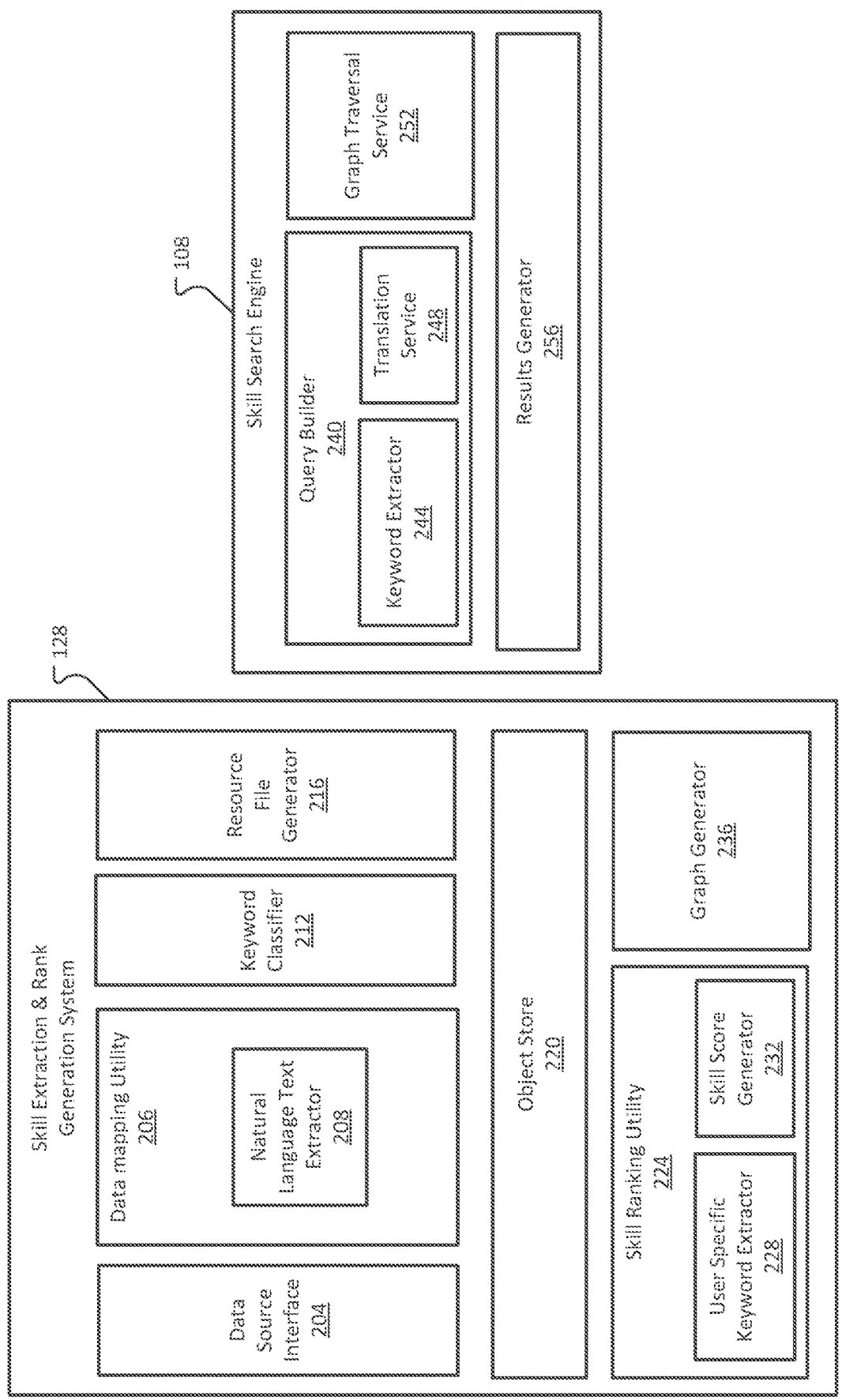
FIG. 2 depicts additional details of a skill extraction and rank generation system and a skill search engine in accordance with examples of the present disclosure.

FIG. 2 depicts additional details of the skill extraction and rank generation system 128 and the skill search engine 108 in accordance with examples of the present disclosure. The skill extraction and rank generation system 128 may include a data source interface 204 for accessing one or more content repositories 112A-112B. In some examples, the data source interface 204 may be provided as an application programming interface and/or a service for connecting to various content repositories 112A-112B. As one example, the data source interface 204 may collect information from GitHub®, LinkedIn®, or other content source. In some examples, the data source interface 204 may receive information that is specific to a technology, company, or other unique entity. In examples, information received by the data source interface 204 may include contextual information associated with an item, such as item 110, in the content repositories 112A-112B. For example, the contextual information may include but is not limited to comments, descriptions, technology, an extension of a file being checked-in, date, time, role information, etc. associated with an item 110. In some examples, the contextual information may include metadata describing the item 110 in the content repositories 112A-112B or describing any other entity associated with the item 110.

The information received at the data source interface 204 may be converted into a structured format utilizing the data mapping utility 206. More specifically, the information received at the data source interface 204 may be in an unstructured format; for example, the item 110 may be unstructured information. The natural language text extractor 208 may extract natural language text from the information received by the data source interface 204 and structure such information in a way so as to preserve, and in some cases, provide relationship and/or dependency information between items and other information in the content repositories 112A-112B, as will be further discussed with respect to FIGS. 3-5B. For example, the information may be structured into a pivot graph. Utilizing one or more keywords specific to a content source, technology, or other knowledge domain, the keyword classifier 212 may identify content from the extracted natural language text of the items 110 that contain and/or are related to the one or more keywords. For example, where an item 110 in one or more content repositories 112A-112B is a pull request, the keyword classifier 212 may parse the extracted natural language text from the pull request and identify one or more areas within the pull request where the keyword, or key term, "C#" is used or mentioned. Accordingly, the keyword and keyword contextual information may be stored to a resource file by the resource file generator 216. That is, the resource file generator 216 may generate a skills and skillsets resource file based on the classification of the information received at that the data source interface 204. A graphing utility may then generate a graph for each individual, where the graph includes the individual and associated technology areas in which the individual has been engaged in. The graph may then be stored in the object store 220.

The skill ranking utility 224 may utilize graphs in the object store 220 to execute or otherwise run a ranking algorithm. The skill raking utility 224 may generate a score for each technology specific to each individual by normalizing instances or occurrence of the technology in graphs across all individuals. The user specific keyword extractor 228 may identify a keyword in the graph and a skill score generator 232 may generate an individual specific score associated with the keyword. Accordingly, a score associated with the keyword becomes indicative of a score associated with a skill possessed by the individual. Further, the skill ranking utility 224 may take into account one or more parameters indicating an overall importance of the type of item 110 in the content source 112A. For example, if an item 110 is a pull request, a parameter or heuristic associated with an attribute of "pull request" may influence how much the "pull request" item 110 influences or otherwise contributes to the score associated with a particular skill or keyword. That is, one or more different items 110 in the content source 112A associated with a same keyword or skill, may be weighted according to the parameter or heuristic. For example, if a first item 110 is a commit and a second item 110 is a pull request, the parameter, or heuristic associated with the pull request may be greater than a parameter, or heuristic associated with the commit, as the pull request may occur at a greater frequency than the commit. As a non-limiting example, one commit may occur for every two pull requests and/or a commit may require a greater amount of skill than a pull request, as a commit may be associated with a review of existing changes or pull requests.

The skills ranking utility 224 may further include time dilation as part of the ranking process. Time dilation takes into account skill degradation over time. As one non-limiting example, a contribution of a pull request for a particular skill occurring one month ago will be greater than a contribution of a pull request for the same particular skill occurring six months ago. Further, time dilation may differ according to an industry or a knowledge domain; accordingly, a type of dilation may be specified and accounted for when generating a score associated with a skill or keyword. As one non-limiting example, the score may be based on an individual's Z score, a heuristic value associated with an attribute of the skill or keyword, and time dilation. For example, the score may be generated according to Equation 1 below:

$$S(x_i) = \left( \left( \frac{x_i - \mu}{3 \cdot \sqrt{\frac{1}{N} \sum (x_i - \mu)^2}} \right) + 1 \right) \cdot \overline{H} \cdot \left| \frac{x_i}{y_i} \right| \cdot f : d \rightarrow d \quad \text{Equation 1}$$

Where $S(x_i)$ is a score for a skill, $x_i$ is a current number of skill occurrences for the individual, $\mu$ is the mean value, N is the number of individuals that possess the skill or keyword, $\overline{H}$ is a heuristic value associated with an attribute, $y_i$ is the total number of skill occurrences across all individuals, and $f:d \rightarrow d$ adjusts the calculated score according to the influences of time dilation. Time dilation may be calculated according to one or more curves having a peak value and an offset. The curve type, peak value, and offset, and scale of the time dilation may be configured according to a specific industry and/or a specific knowledge domain and may be based on how quickly a skill degrades over time. As one non-limiting example, the time decay d may be calculated according to Equation 2.

$$d = \left(\left(\frac{mi \cdot d}{100}\right) \cdot \frac{ti - (dt + da)}{ds}\right)$$ Equation 2 where mi is the peak value of the curve, ti is the number of days between the occurrence of the skill and the current date, dt is the origin of curve (default may be set to 0), da is the offset, and ds is a decay scale. The dilation function may then be calculated according to Equation 3 determine an amount of dilation that contributes to the overall score $S(x_i)$.

$$f:d=(m_i-d) \rightarrow d \in (m_i, 0)$$ Equation 3:

The weighting, or heuristic value $\overline{H}$ associated with an attribute may be specific to an industry or knowledge domain. An example of heuristic values is provided in Table 1 below.

TABLE 1

| Attribute Name | Heuristic | Source |
|---|---|---|
| Project | 1.0 | Natural Language |
| Repository | 1.0 | Natural Language |
| Commits | 5.0 | Natural Language |
| Commit Change | 3.0 | File Type |
| Pull Request | 10.0 | Natural Language |
| Pull Request Iterations | 8.0 | Natural Language |
| Pull Request Reviewer | 15.0 | Fail/Success Ratio |
| Packages | N/A | Type |
| Work Item Created | 5.0 | Natural Language |
| Work Item Assigned | 10.0 | Natural Language |
| Work Item Resolved | 6.0 | Natural Language |
| Work Item Closed | 1.0 | Natural Language |
| Code Review | 10.0 | Natural Language |

As provided in Table 1, each attribute, such as "pull request," "commit," "code review," etc. may be associated with a specific weighting or heuristic value determined according to industry or knowledge domains. That is, attributes for software development may be different from attributes for other knowledge domains, such as information creation, medical, or sports domains to name a few. In addition, each of the values associated with each attribute may be customized to a specific process for a company or use. For example, a company may enact a different process whereby one attribute is encouraged and another attribute is discouraged. Such encouragement may be evidenced by the value of the corresponding heuristic.

While many examples described herein describe a skill extraction and scoring process associated with an industry specific to software and/or software development, it should be appreciated that such skill extraction and scoring processes are not limited to one particular industry but may be applicable to all industries and/or knowledge domains. For example, a skill associated with an artist may be extracted from a comment received at a blog; such skill may be scored based on pool of other artists possessing the same skill and/or together with one or more comments.wyodenv In addition, because a score associated with the skill is based on not only the individual's interaction with the particular skill, but is normalized across all individuals who have interacted with the skill, the score ascribed to the individual for a particular score may change when additional individuals possessing the same skill are considered.

As an example, suppose a signal type 1 is observed for three individuals all on the same day, where the signal type 1 may be pull requests, commits, packages, etc. The individual's scores associated with the skill of C#, assuming no time dilation and a Heuristic equal to ten, the individual's comparative score for the skill C# may be determined as provided in Table 2 below.

TABLE 2

| Individual 1 | 10 signal type 1 | Score: 7.985 |
|---|---|---|
| Individual 2 | 5 signal type 1 | Score: 0.278 |
| Individual 3 | 2 signal type 1 | Score: 0.082 |

Suppose a fourth individual is added to the group above. If a signal of type 1 was observed for all four individuals all on the same day, the individual's scores associated with the skill of C#, assuming no time dilation and a Heuristic equal to ten may be determined as provided in Table 3 below.

TABLE 3

| Individual 1 | 10 signal type 1 | Score: 5.817 |
|---|---|---|
| Individual 2 | 5 signal type 1 | Score: 1.877 |
| Individual 3 | 2 signal type 1 | Score: 0.503 |
| Individual 4 | 7 signal type 1 | Score: 3.205 |

While the scores in Table 3 changed for Individual 1, Individual 2, and individual 3, the ranking between individuals did not change. That is, Individual 1 is ranked higher than Individual 2, and Individual 2 is ranked higher than Individual 3. However, Individual 4 is now included in the group and would be included in the top 3, while Individual 3 would no longer be included in the top 3. Of course, scores would generally be based on differing attributes or signal types. For example, attributes, or signal types corresponding to the software development industry may include but is not limited to pull requests, commits, iterations etc. In some examples, time dilation may be accounted for based on one or more distributions or curves. For example, a Gaussian distribution may be utilized in the process of accounting for time dilation.

Once the skill score generator 232 generates a score for each skill or keyword on an individual basis, a graph generator 236 may update an existing graph and/or create a new graph providing weighted edges between the individual and skill. For example, an individual may be linked to C#; an edge between the user and C# may be indicative of a score assigned to the user for the skill C#. Further, as a plurality of users may be associated with the skill of C#, the graph generated by the graph generator 236 may include all users possessing the skill of C# together with their associated skill score. The graph generator 236 may store the graph in the object store 220.

The skill search engine 108 may be utilized to receive keyword or skill search criteria from a user, such as user 102, search for individuals possessing such skills, and provide results that include the individuals possessing the skills. The results may be ranked by skill strength, as determined by an individual's skill score. For example, a user 102 may be looking for an individual possessing a certain skill or skillset. The user may enter keywords associated with the desired skill or skills in the user interface 120. Once the keywords are received at the skill search engine 108, a query may be generated based on the keywords. In some examples, the query builder 240 of the skill search engine 108 may extract one or more keywords from the keywords entered by the user and translate the keywords into one or more keywords of the autonomous inherent skillset comparative scoring and extraction system 100. For example, the query builder 240 may receive a keyword of "stored procedures." If the keywords "stored procedure" aren't part of the autonomous inherent skillset comparative scoring and extraction system 100, the query builder 240 may translate "stored procedures" into "subroutines and relational database management system" (RDBMS) A graph traversal service, such as the graph traversal service 252, may be utilized to traverse the graph including the individuals, skills, and corresponding scores. For example, the graph 534 may be traversed, via a node to node traversal for example, to find individuals associated with the keywords of "stored procedures" or "subroutines and relational database management system." Utilizing graphs over traditional data storage entities, such as in an RDBMS, the efficiency and speed of locating the greatest score may be increased. For example, utilizing a random walk process, the location of the node corresponding to a greatest score for a skill associated with a user can be quickly identified utilizing node to node traversal. In some examples, only the individual having a highest or greatest score is identified. In some examples, the top ten individuals based on score may be identified. Accordingly, the results generator 256 may provide the results back to the user 102 via the user interface 120 or 124.

Figure 3:
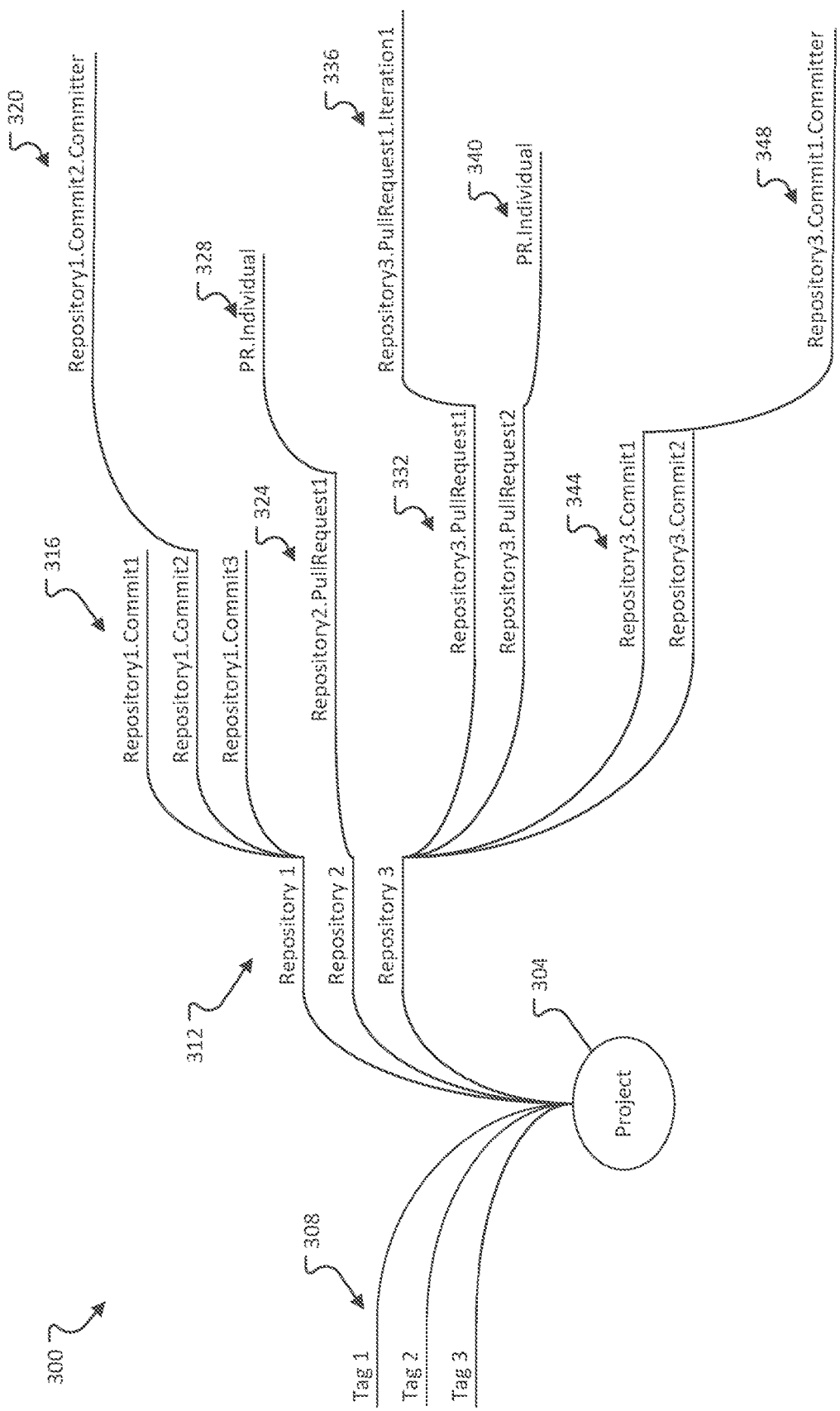
FIG. 3 depicts a first example of a pivot graph in accordance with examples of the present disclosure.

FIG. 3 depicts an example of a pivot graph 300 for a specific project 304 for a developer knowledge domain in accordance with examples of the present disclosure. The pivot graph 300 may be generated by the skill extraction and rank generation system 128 and may be based on the information included in the resource file previously described. The pivot graph 300 generally depicts relationships between items 110 which may be found in a content source 112A-112B and may include contextual information associated with each item. As depicted in FIG. 3, the project 304 may span multiple repositories 312, where repositories 312 may be same as or similar to the content repositories 112A-112B. In addition, one or more tags 308 associated with the project 304 may be included in the pivot graph, where the tags 308 may include contextual information about the project for example. As depicted in FIG. 3, one or more commits 316 may be associated with the repository "Repository 1". Each commit 316 may include or otherwise identify the individual 320 responsible for the performing the commit. As another example, a pull request 324 may be associated with "Repository 2" and the individual responsible for initiating the pull request may be identified by PR.Individual 328. As another example, a pull request "Repository3.PullRequest1" 332 may include an iteration 336. The "Repository3.PullRequest2" may identify the pull request individual as PR.Individual 340. As another example, a committer 348 may be associated with the "Repository3.Commit1." The pivot graph 300 generally identifies individuals associated with each attribute, such as pull request, commit, iteration etc. For example, the PR.Individual 328 may be associated with the pull request 324 and the committer 348 may be associated with the commit 344.

Figure 4:
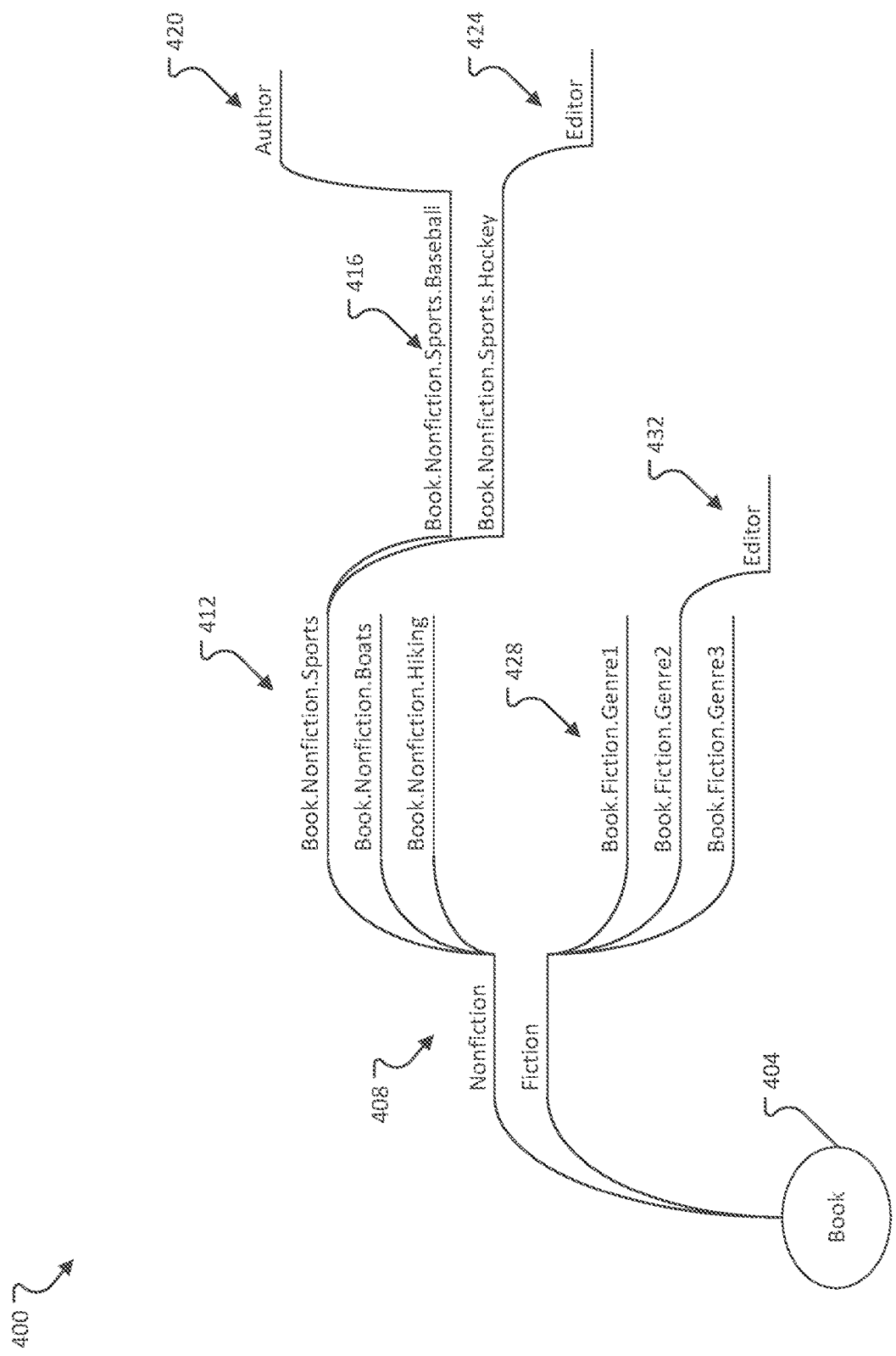
FIG. 4 depicts a second example of a pivot graph in accordance with examples of the present disclosure.

While FIG. 3 generally depicts a pivot graph for a developer knowledge domain, FIG. 4 depicts a pivot graph 400 associated with one or more skills involved in a book or reading material knowledge domain. For example, one or more books 404 may identified as fiction or non-fiction at 408; each non-fiction book may be further classified categorically according to content. As depicted in FIG. 4, a non-fiction book may be classified as a sports book, book about boats, or book about hiking. Of course, other topics or categories are certainly contemplated. A sports book may further be classified according to a particular spoil at 416. For example, the sports book may be about baseball or hockey. Each book may also include an editor 424 and/or author 420. Performing a skill traversal of the pivot graph 400 would identify an editor 424 associated with a nonfiction hockey book. Accordingly, skills associated with an editor may include or otherwise be related to a knowledge about hockey, knowledge about nonfiction sports books, and/or knowledge about nonfiction books. Similarly, a particular set of skills associated with an editor 432 may be determined according to a particular genre 428 of fiction books, and/or fictions books in general.

Figure 5A:
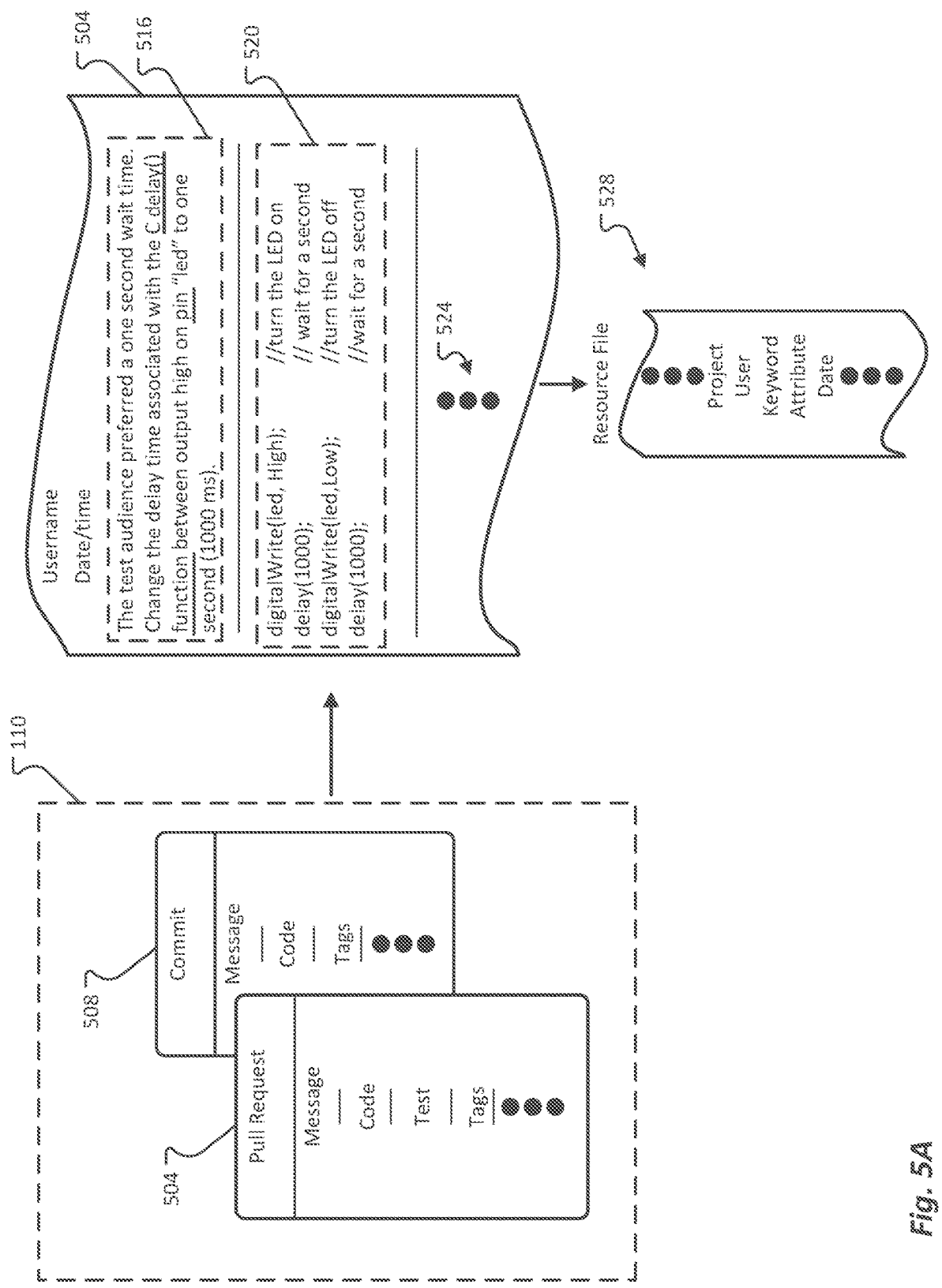
FIG. 5A depicts details of a first portion of a process for generating a score associated with a skill or keyword from an item from a content source in accordance with examples of the present disclosure.
Figure 5B:
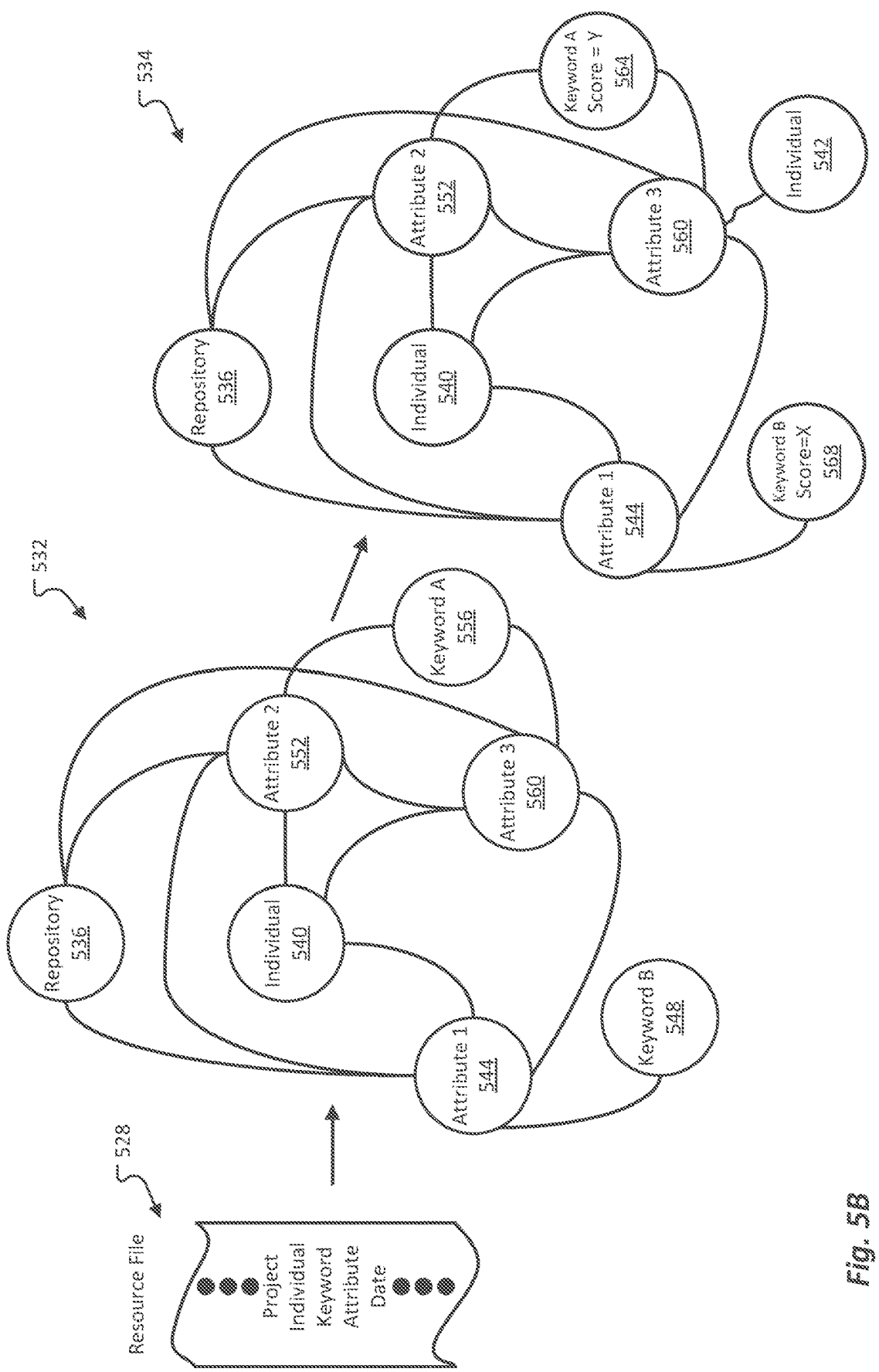
FIG. 5B depicts details of a second portion of the process for generating a score associated with a skill or keyword from an item from a content source in accordance with examples of the present disclosure.

FIGS. 5A-5B depict additional details associated with generating a score associated with a skill or keyword based on one or more items 110 in a content source. For example, an item 110 may reside in one or more of the content repositories 112A-112B. A first example of an item 110 is a pull request 504 and a second example of an item 110 is a commit 508. The natural language text extractor 208 may receive the item 504 and convert one or more portions of the item 504 into a natural language text such that the keyword classifier 212 may identify one or more keywords in the converted text. For example, the pull request 504 may include a comment section 516, a code section 520, a test section, and any tags. The pull request 504 may include other sections as indicated by the ellipses 524. After performing a natural language processing operation on the comment and code sections 516 and 520, the keyword classifier may identify keywords, such as "C delay ( ) function" and "pin." Such keywords may be associated with a specific technology, in this instance software development. Project information, individual information, keyword information, attribute information, and/or date information may be included in a resource file 528 such that the information obtained from the item 504 may be converted into a graph 532 as depicted in FIG. 5B. The graph 532 may provide associations between nodes, where nodes may be associated with a source 536, individual 540, various attributes 552, 554, and 560, and various keywords 556 and 548. For example, the graph 532 may link an individual 540 to one or more attributes, such as a pull request or commit. The attributes may be linked to one or more keywords, such as C#, model, model-view-controller etc. As each keyword is generally associated with a skill, each skill may be traced back to the attribute and again to the individual. Accordingly, the skill ranking utility 224 may identify keyword A and generate a score for the keyword for each individual based on the attribute associated with the keyword as previously discussed. In addition, date and time information may be utilized to perform time dilation for one or more skills.

Figure 6:
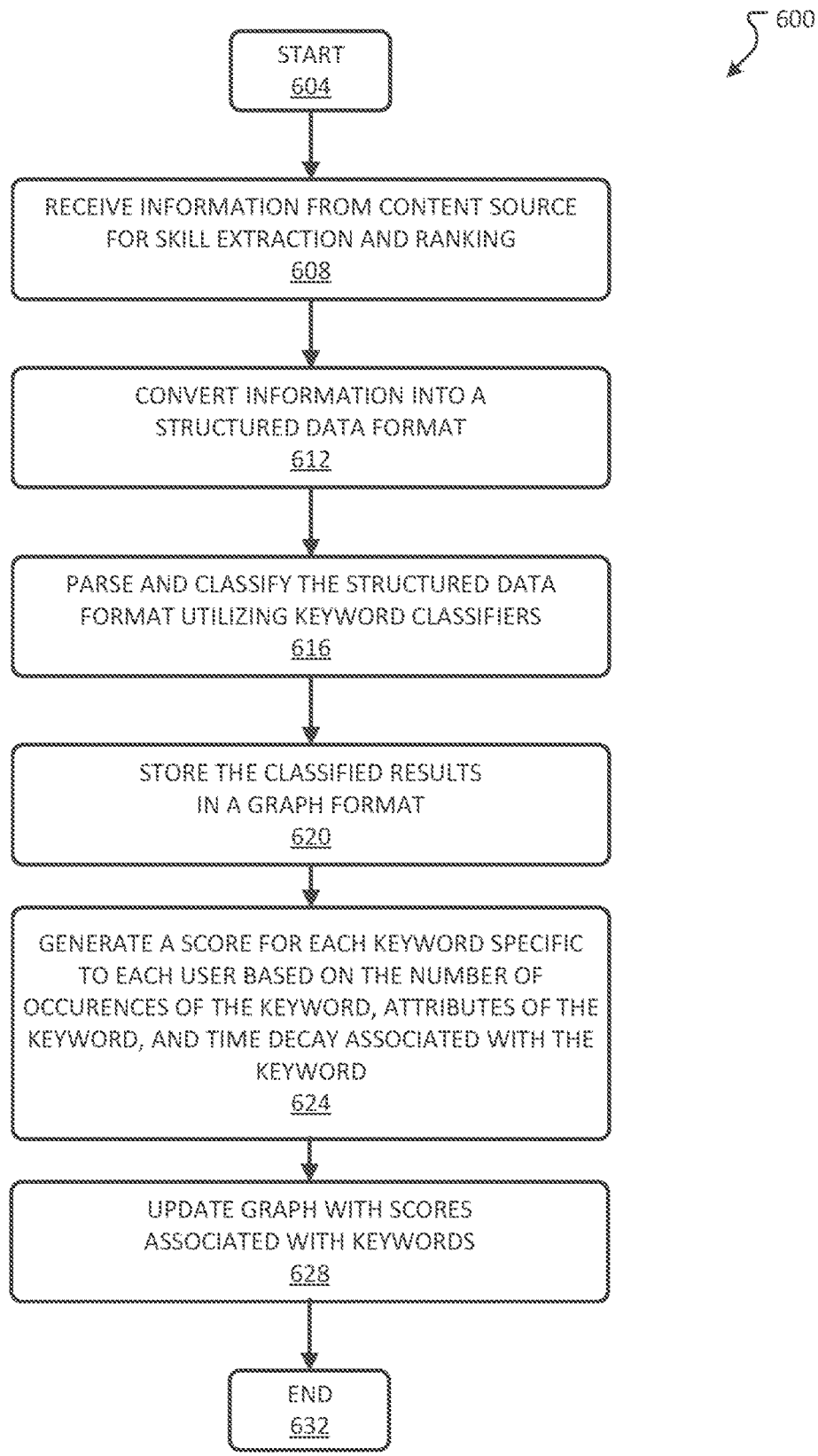
FIG. 6 depicts a first flow chart in accordance with examples of the present disclosure.

FIG. 6 depicts details of a method 600 for scoring one or more skills extracted from a content source in accordance with examples of the present disclosure. A general order for the steps of the method 600 is shown in FIG. 6. Generally, the method 600 starts at 604 and ends at 632. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, Application Specific Integrated Circuit (ASIC), a field programmable gate array (FPGA), a system on chip (SOC), or other hardware device. Hereinafter, the method 600 shall be explained with reference to the systems, components, modules, software, data structures, user interfaces, etc. described in conjunction with FIGS. 1-5B.

The method starts at 604, where flow may proceed to 608. At 608, information from a content source may be received. The information may correspond to one or more items in the content source. For example, the item may be item 110 as previously discussed and may be received at the data source interface 204 for example. Flow may then proceed to 612 where the information received may be converted into a structured data format by the data mapping utility 206 for example. For example, the information received from the one or more content repositories may be converted into a pivot graph as depicted in FIG. 3 and FIG. 4. The method 600 may then proceed to 616, where keywords may be utilized to classify the information converted into a structured format. The keywords may generally be associated with a specific knowledge domain and are generally representative of the one or more skills that are to be extracted from the content repositories. The identified keywords, together with contextual and attribute information for the keywords, may then be stored in a graph format at 620. The graph format may link individual(s) to attributes and keywords. An example of the graph is graph 532. Accordingly, skills, or keywords, may be easily discernable by traversing the nodes of the graph from individual to attribute and to skill. As one non-limiting example, a individual may be associated with a pull request for a skill of C#. The pull request may be an attribute and the skill may be a keyword.

The method 600 may then proceed to 624 where a score may be generated for each keyword in the graph. The score may be generated by the skill score generator 232 and may take into account an attribute associated with the keyword and time dilation, if any, associated with the keyword. For example, a keyword, or skill, associated with a pull request that occurred three years ago would contribute less to a score for the keyword (skill) than a pull request that occurred one month ago for the same keyword. In some examples, a individual may have worked on a project involving many commits, pull requests, iterations, etc. for a particular skill, such as C#. Accordingly, all instances of the individual interacting with the particular skill C# are utilized in the score generation process. In addition, because a score associated with the skill is based on not only the individual's interaction with the particular skill, but is normalized across all individuals who have interacted with the skill, the score ascribed to the individual for a particular score may change when additional individuals possessing the same skill are considered as previously described with respect to FIG. 2. The method 600 may then proceed to 628, where the graph may be updated to reflect the scores associated with the keywords. An example of the graph is graph 534.

The method 600 may run continuously or run in accordance with a timed event. For example, every morning, individual scores associated with various technologies may be updated. In some examples, the method 600 may be continuously run every instance a content source is changed. The method 600 may end at 632.

Figure 7:
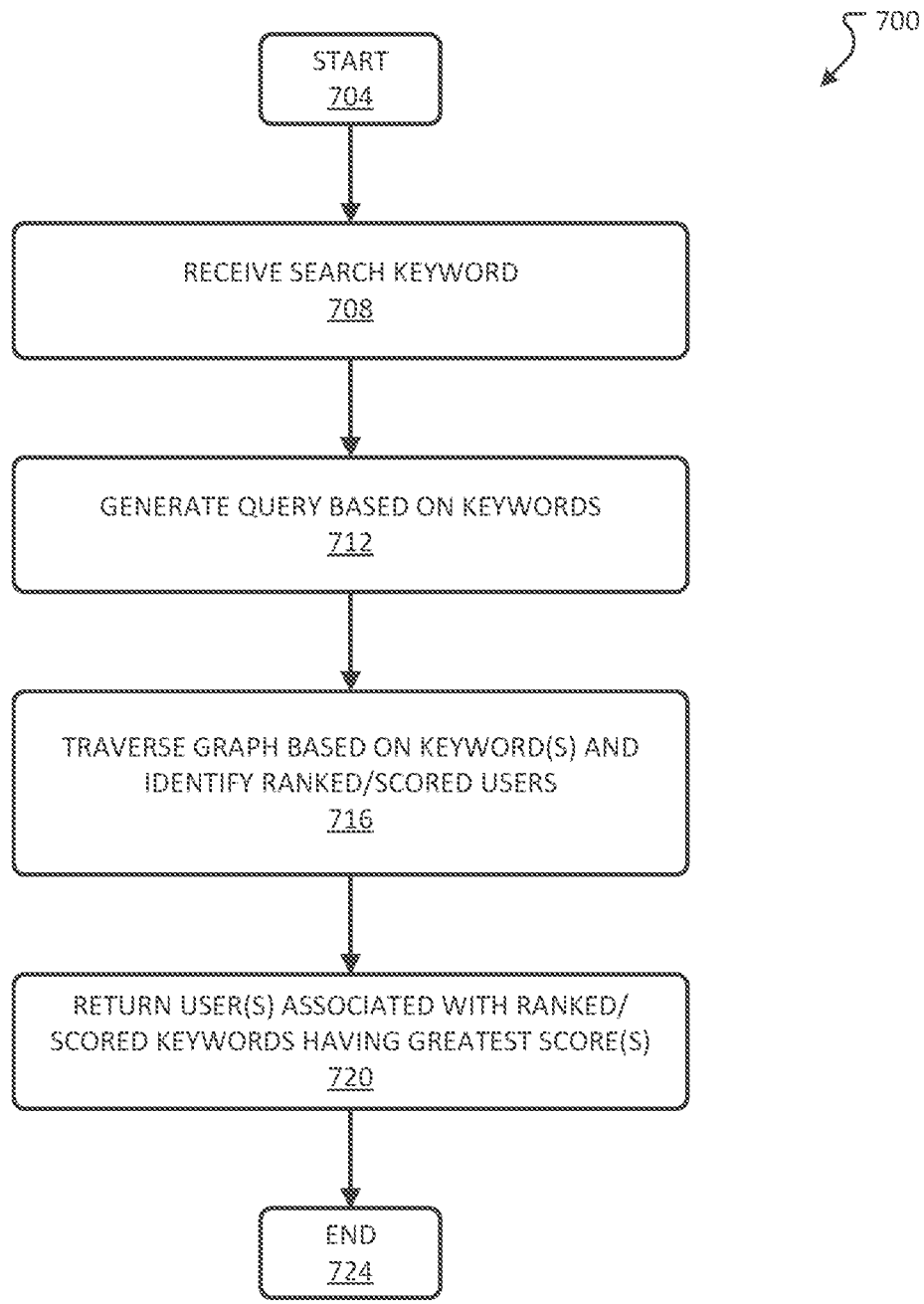
FIG. 7 depicts a second flow chart in accordance with examples of the present disclosure.

FIG. 7 depicts details of a method 700 for searching for one or more individuals possessing a skill or skillset in accordance with examples of the present disclosure. A general order for the steps of the method 700 is shown in FIG. 7. Generally, the method 700 starts at 704 and ends at 724. The method 700 may include more or fewer steps or may arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, Application Specific Integrated Circuit (ASIC), a field programmable gate array (FPGA), a system on chip (SOC), or other hardware device. Hereinafter, the method 700 shall be explained with reference to the systems, components, modules, software, data structures, user interfaces, etc. described in conjunction with FIGS. 1-6.

The method starts at 704, where flow may proceed to 708. At 708, keywords may be received, for example, at a user interface 120. For example, a user 102 may be looking for an individual possessing a certain skill or skillset. The user may enter keywords associated with the desired skill or skills in the user interface 120. Once the keywords are received at 708, a query may be generated based on the keywords at 712. In some examples, the query builder 240 of the skill search engine 108 may extract one or more keywords from the keywords entered by the user at 708 and translate the keywords into one or more keywords of the autonomous inherent skillset comparative scoring and extraction system 100. For example, the query builder 240 may receive a keyword of "stored procedures." If the keywords "stored procedure" aren't part of the autonomous inherent skillset comparative scoring and extraction system 100, the query builder 240 may translate "stored procedures" into "subroutines and relational database management system" (RDBMS) A graph traversal service, such as the graph traversal service 252, may be utilized to traverse the graph including the individuals, skills, and corresponding scores. For example, the graph 534 may be traversed to find individuals associated with the keywords of "stored procedures" or "subroutines and relational database management system." In some examples, only the individual having a highest or greatest score is identified. In some examples, the top ten individuals based on score may be identified. The method may then proceed to 720, where the identified individual(s) are returned. For example, the individuals may be displayed at the user interface 120. The method may then end at 724.

Figure 8:
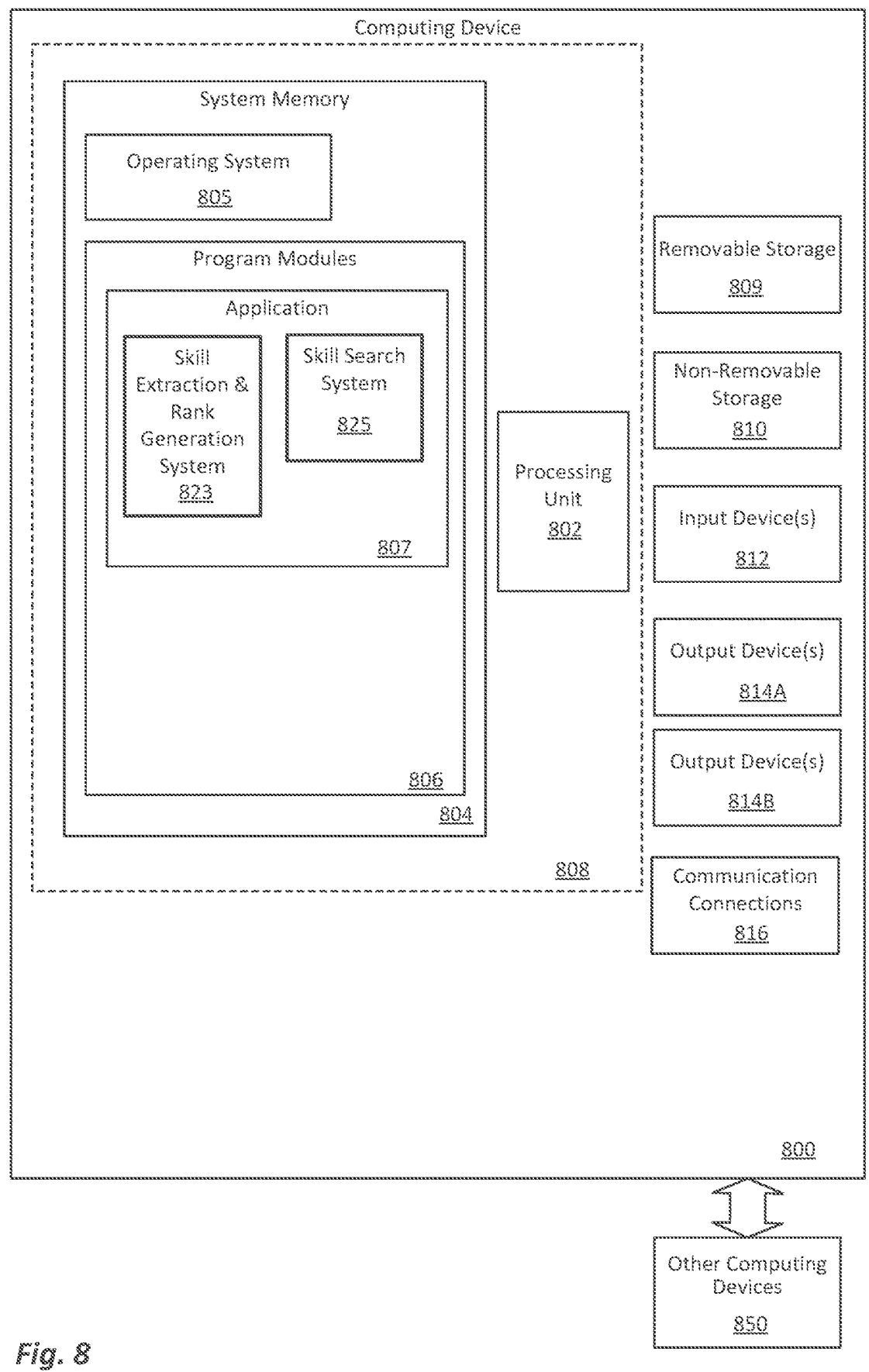
FIG. 8 depicts a block diagram illustrating physical components of a computing device with which aspects of the disclosure may be practiced.
Figure 9A:
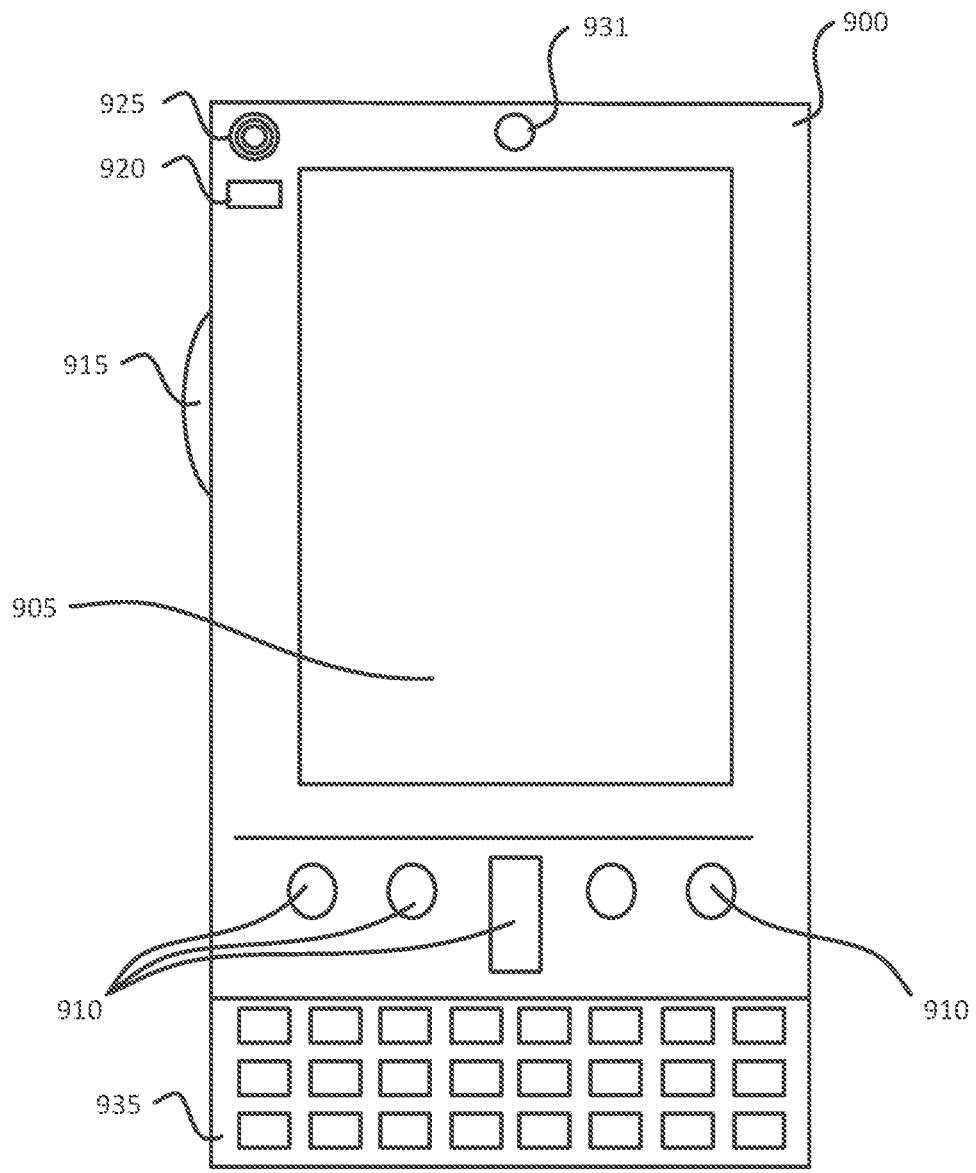
FIG. 9A illustrates a first example of a computing device with which aspects of the disclosure may be practiced.
Figure 9B:
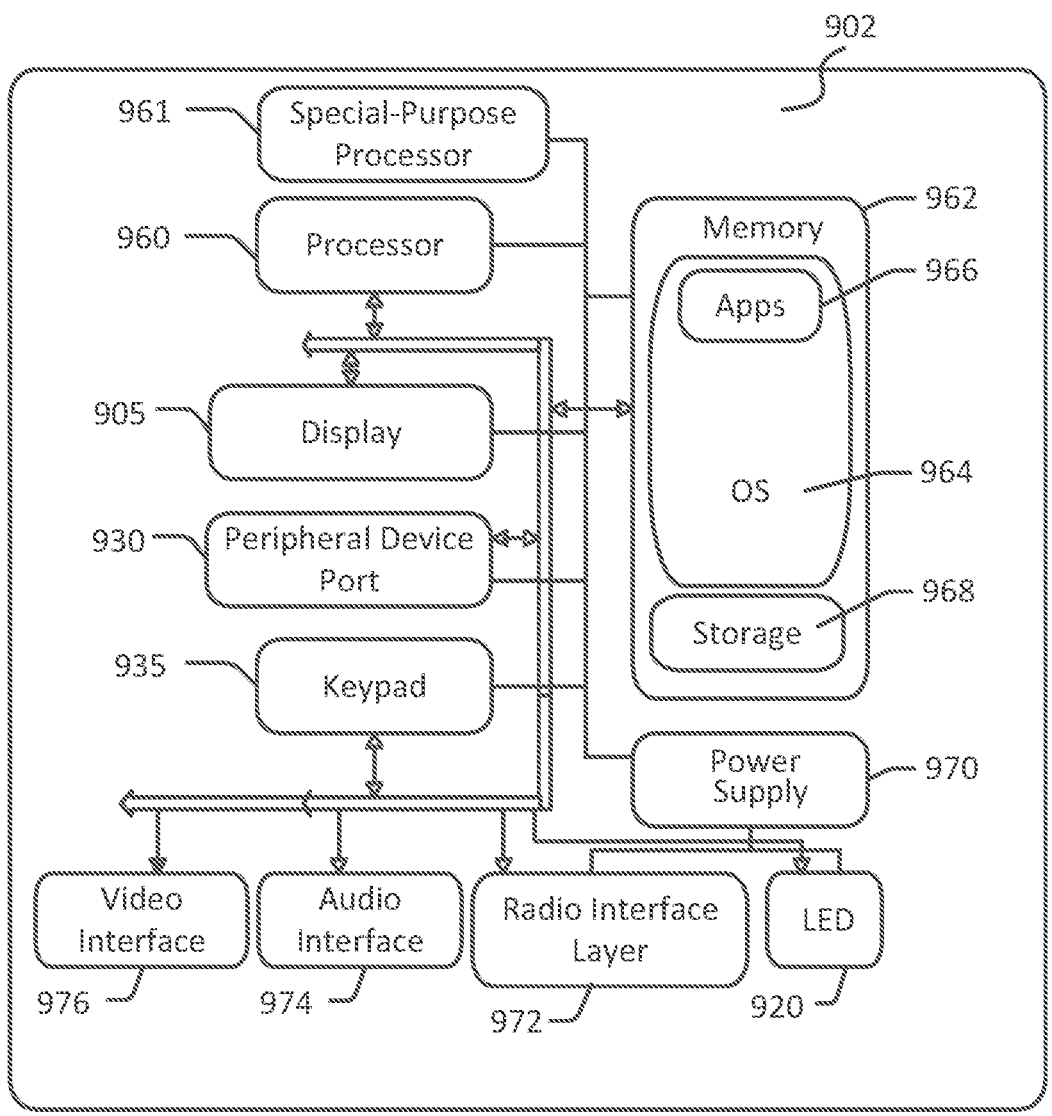
FIG. 9B illustrates a second example of a computing device with which aspects of the disclosure may be practiced.
Figure 10:
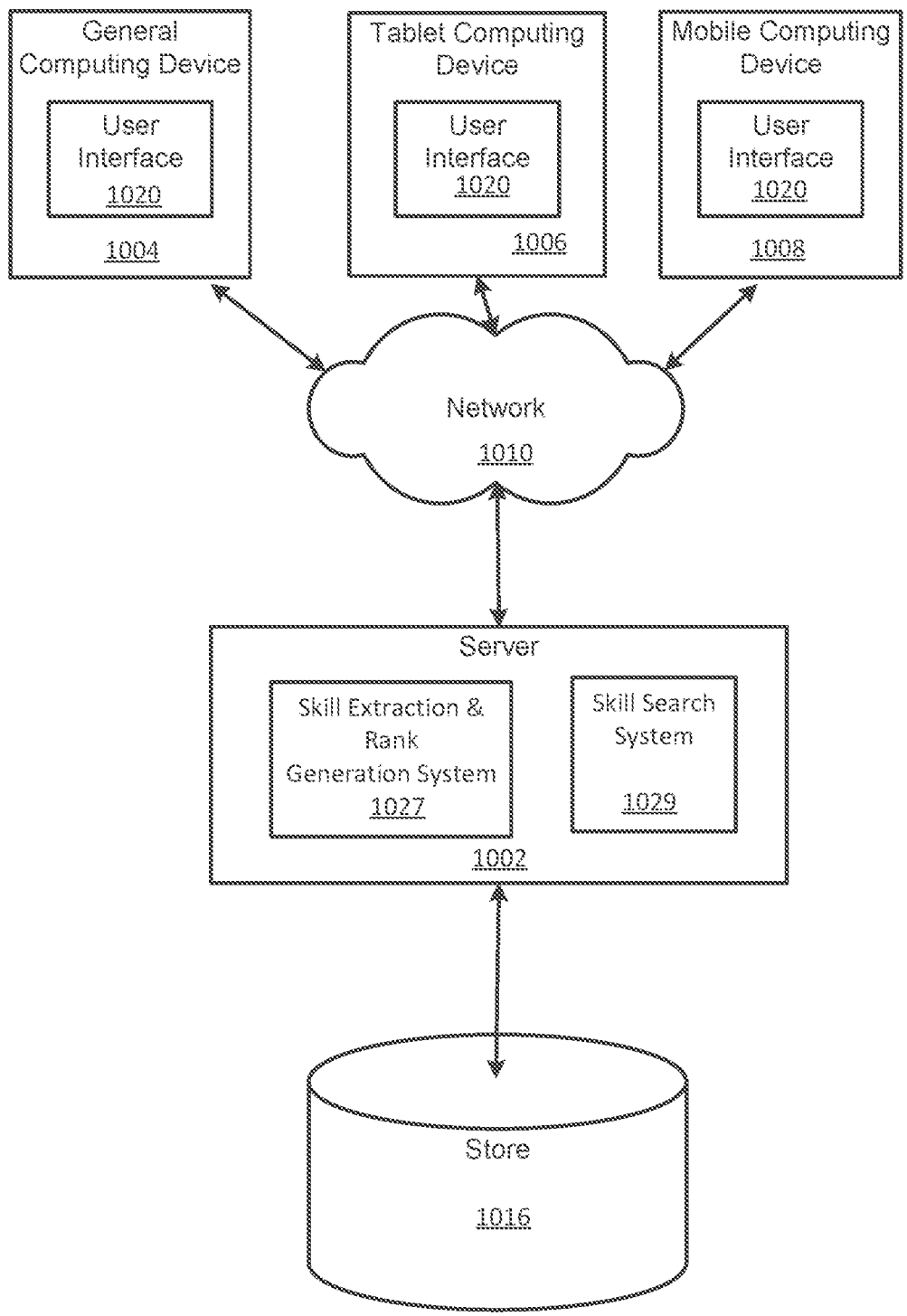
FIG. 10 illustrates at least one aspect of an architecture of a system for processing data in accordance with examples of the present disclosure.

FIGS. 8-10 and the associated descriptions provide a discussion of a variety of operating environments in which aspects of the disclosure may be practiced. However, the devices and systems illustrated and discussed with respect to FIGS. 8-10 are for purposes of example and illustration and are not limiting of a vast number of computing device configurations that may be utilized for practicing aspects of the disclosure, described herein.

FIG. 8 is a block diagram illustrating physical components (e.g., hardware) of a computing device 800 with which aspects of the disclosure may be practiced. The computing device components described below may be suitable for the computing devices described above. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories.

The system memory 804 may include an operating system 805 and one or more program modules 806 suitable for running software applications 820, such as but not limited to a skill extraction and rank generation system 823, a skill search system 825, and/or one or more components supported by the systems described herein. For example, the skill extraction and rank generation system 823 receive information from one or more content repositories and rank one or more users based on a generated skill store as described with respect to, but not limited to, at least FIGS. 1-6 of the present disclosure. The skill search system 825 may receive keywords and return users associated with the received keywords as described with respect to, but not limited to, FIGS. 1-2 and 7 of the present disclosure. The operating system 805, for example, may be suitable for controlling the operation of the computing device 800.

Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the at least one processing unit 802, the program modules 806 may perform processes including, but not limited to, one or more aspects, as described herein. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814A such as a display, speakers, a printer, etc. may also be included. An output 814B, corresponding to a virtual display may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 9A and 9B illustrate a computing device or mobile computing device 900, for example, a mobile telephone, a smart phone, wearable computer (such as a smart watch), a tablet computer, a laptop computer, and the like, with which aspects of the disclosure may be practiced. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some aspects. In yet another alternative aspect, the mobile computing device 900 is a portable phone system, such as a cellular phone. The mobile computing device 900 may also include an optional keypad 935. Optional keypad 935 may be a physical keypad or a "soft" keypad generated on the touch screen display. In various aspects, the output elements include the display 905 for showing a graphical user interface (GUI), a visual indicator 931 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external source.

FIG. 9B is a block diagram illustrating the architecture of one aspect of computing device, a server, or a mobile computing device. That is, the computing device 900 can incorporate a system (e.g., an architecture) 902 to implement some aspects. The system 902 can implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and/or one or more components supported by the systems described herein. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g. a skill extraction and rank generation system 823, a skill search system 825, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated configuration, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with aspects of the present disclosure, the microphone may also serve as an audio sensor to facilitate control of notifications, as will be described below. The system 902 may further include a video interface 976 that enables an operation of an on-board camera to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 402 may be stored locally on the mobile computing device 900, as described above, or the data may be stored on any number of storage media that may be accessed by the device via the radio interface layer 972 or via a wired connection between the mobile computing device 400 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

FIG. 15 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types.

A user interface associated with the skill search system 825 and/or one or more components supported by the systems described herein may be employed by a client that communicates with server device 1002. In some aspects, one or more of a skill extraction and rank generation system 823 and a skill search system 825 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system. The store 1016 may refer to, one or more of the storage locations, such as the object store 220.

FIG. 10 illustrates an exemplary mobile computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A B and C," "at least one of A, B. or C," "one or more of A, B, and C," "one or more of A, B, or C," "A, B, and/or C," and "A. B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

In accordance with at least one example of the present disclosure, a method for extracting skills from information associated with a content source and ranking individuals based on the extracted skills is provided. The method may include: receiving information from a content source, associating a keyword to a portion of the received information, wherein the keyword is indicative of at least one skill, associating one or more individuals to the keyword based on the one or more individuals having interacted with the respective associated portion of received information, for each individual of the one or more individuals, generating a keyword score based on a summation of one or more instances of the individual being associated with the keyword and a normalization of the summation over a plurality of individuals associated with the keyword, and storing each keyword score associated with each individual and each keyword in a traversable graph, the traversable graph linking each individual of the one or more individuals to each keyword based on the keyword score.

At least one aspect of the above method includes where the information received from the content source corresponds to a work item created by the one or more individuals. At least one aspect associated with an above aspect and/or the above method includes the content source is a version control repository for software and the work item is at least one of a pull request or commit associated with the version control repository for software. At least one aspect associated with an above aspect and/or the above method includes associating at least one attribute to one or more instances of the keyword based on work item, wherein the keyword score is based on the at least one attribute associated with each instance of the keyword. At least one aspect associated with an above aspect and/or the above method includes where the keyword score changes based on a difference in time between when the individual interacted with a portion of the work item and when the keyword score is generated. At least one aspect associated with an above aspect and/or the above method includes where the keyword score decreases over time. At least one aspect associated with an above aspect and/or the above method includes where each keyword score, each keyword, and each individual of the one or more individuals are stored in the traversable graph such that the keywords and individuals are nodes of the graph. At least one aspect associated with an above aspect and/or the above method includes receiving a keyword corresponding to a keyword score, traversing the traversable graph for the received keyword, identifying an individual having a greatest keyword score for the received keyword, and providing a result based on the individual having the greatest keyword score for the received keyword.

At least one aspect associated with an above aspect and/or the above method includes receiving additional information from the content source, associating the keyword to a portion of the received additional information, associating an additional individual to the keyword based on the additional individual having interacted with the respective associated portion of the received additional information, and for each individual of the one or more individuals and including the additional individual, generating a keyword score based on a summation of one or more instances of the each individual being associated with the keyword and a normalization of the summation over a plurality of individuals associated with the keyword.

In accordance with at least one example of the present disclosure, a system for ranking individuals based on a skill identified from a content source is provided. The system may include a processor, and memory including instructions which when executed by the processor, causes the processor to: receive information from a content source, the content source including a work item associated with a plurality of individuals, classify a portion of the work item based on one or more keywords, wherein the one or more keywords are indicative of at least one skill, for each individual of the plurality of individuals, generate a score associated with the keyword based on a summation of one or more instances of the individual being associated with the keyword and a normalization of the summation over a group of individuals being associated with the keyword, store each keyword score associated with each individual and each keyword in a traversable graph, the traversable graph linking each individual of the one or more individuals to each keyword based on the keyword score, traverse the graph based on a keyword and keyword score, and provide a score associated with one or more of the plurality of individuals to a display of a computing device.

At least one aspect of the above system includes where the instructions, which when executed by the processor, cause the processor to associate at least one attribute to the work item, wherein the score associated with the keyword for each individual is based on the at least one attribute being associated with each instance of the keyword. At least one aspect associated with an above aspect or the above system includes where the score associated with the keyword for each individual changes based on a difference in time between when an individual interacted with the work item and when the score is generated. At least one aspect associated with an above aspect or the above system includes where the score associated with the keyword for each individual decreases as the difference in time increases. At least one aspect associated with an above aspect or the above system includes where the instructions, which when executed by the processor, cause the processor to receive a search term from a user interface, generate a search query based on the received search term, and provide a result to the user interface based on the search query, wherein the result includes the score associated with one or more of the plurality of individuals.

In accordance with at least one example of the present disclosure, a method for extracting a skill from information associated with a content source and ranking an individual against other individuals possessing the skill is provided. The method may include receiving information from a content source, converting the received information into a structured format, applying one or more classifiers to the information in the structured format, the one or more classifiers identifying a portion of the structured format as being associated with a skill, associating an individual with the skill based on the interaction of the individual with the portion of the structured format, scoring an individual based on the individual's interactions with the skill and other individuals' interactions with the skill, storing the score associated with the individual and each skill in a traversable graph, the traversable graph linking the individual to the skill based on the score, and providing the score associated with the individual to a user interface of a display device.

At least one aspect of the above method may include where the score is based on a summation of the number of instances in which the individual is associated with the skill and a normalization of the summation over the plurality of individuals associated with the skill. At least one aspect associated with an above aspect and/or method may include associating at least one attribute to the portion of the structured format, wherein the score is based on the at least one attribute and a difference in time between when the individual interacted with the information associated with the structured portion of content when the score is generated. At least one aspect associated with and above aspect and/or the above method may include where the score decays over time. At least one aspect associated with and above aspect and/or the above method may include receiving a search term from the user interface, generating a search query based on the received search term, and returning the score associated with the individual as a search result, and providing the search result to the user interface of the display device. At least one aspect associated with an above aspect and/or method may include where the content source is a version control repository for software and the received information is at least one of a pull request or commit associated with the version control repository for software.

The disclosure is not limited to standards and protocols if described. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The invention claimed is:

1. A non-transitory computer storage media including instructions that, when executed by a processor, cause the processor to:
   determine one or more work items in a content source;
   analyze each of the one or more determined work items to identify one or more skills associated with each of the one or more determined work items;
   identify one or more individual that created, edited, reviewed, or approved one or more of the one or more determined work items;
   generate a skill score for each of the one or more identified individuals, wherein each individual's skill score is based on a summation of instances in which the individual created, edited, reviewed, or approved one or more of the one or more determined work items that are associated with the skill, and a normalization of the summation over a plurality of individuals associated with the skill;
   store, in a traversable graph, each individual of the one or more individuals, each identified individual's generated skill score, and each skill wherein the traversable graph links each individual of the one or more individuals, each skill, and each skill score;
   specify a type of time dilation for each of the identified individual's generated skill scores, wherein the time dilation is based on a knowledge domain associated with the skill score and accounts for skill degradation over time by decreasing the identified individual's skill score from the point of last interaction with the one or more determined work items to the present time;
   cause display the one or more individuals' possessing skills scores, wherein the score is calculated based on a current number of skill occurrences for the individual minus a mean value, over three times a square root of one over a number of the individuals that possess the skill or keyword times a sum of a squared value of the current number of skill occurrences for the individual minus a mean value, plus one, times a heuristic value, times the current number of skill occurrences for the individual over a total number of skill occurrences across all of the one or more individuals, times an adjusted calculated score according to an influence of time dilation; and
   automatically decrease each of the identified individual's generated skill scores in the traversable graph based on the combination of a heuristic value associated with the skill and the specified type of time dilation.

2. The non-transitory computer storage media of claim 1, wherein the content source is a version control repository for software and the work item is at least one of a pull request or commit associated with the version control repository for software.

3. The non-transitory computer storage media of claim 1, further comprising associating a plurality of skills to the work item.

4. The non-transitory computer storage media of claim 1, wherein each skill score, each skill, and each individual of the one or more individuals are stored in the traversable graph such that the skills and individuals are nodes of the graph.

5. The non-transitory computer storage media of claim 1, further comprising:
   receiving a skill corresponding to a skill score;
   traversing the traversable graph for the received skill;
   identifying an individual having a greatest skill score for the received skill; and
   providing a result based on the individual having the greatest skill score for the received skill.

6. The non-transitory computer storage media of claim 1, further comprising:
   receiving additional information from the content source;
   associating the skill to a portion of the received additional information;
   associating an additional individual to the skill based on the additional individual having created, edited, reviewed, or approved the respective associated portion of the received additional information; and for each individual of the one or more individuals and including the additional individual, generating a skill score based on a summation of one or more instances of each individual being associated with the skill and a normalization of the summation over a plurality of individuals associated with the skill.

7. A system for ranking individuals based on a skill identified from a content source, the system comprising:
a processor; and
memory including instructions which when executed by the processor, causes the processor to:
determine one or more work items associated with a plurality of individuals in a content source;
analyze each of the one or more determined work items to identify one or more skills associated with each of the one or more determined work items;
identify one or more individuals of the plurality of individuals that created, edited, reviewed, or approved one or more of the one or more determined work items;
generate a skill score for each of the one or more identified individuals, wherein each individual's skill score is based on a summation of instances in which the individuals created, edited, reviewed, or approved one or more of the one or more determined work items that are associated with the skill, and a normalization of the summation over a group of individuals being associated with the skill;
store, in a traversable graph, each individual of the one or more individuals, each identified individual's generated skill score, and each skill, wherein the traversable graph links each individual of the one or more individuals, each skill, and each skill score;
traverse the graph based on a skill and skill score;
provide a skill score associated with an individual of the plurality of individuals to a display of a computing device;
specify a type of time dilation for each of the identified individual's generated skill scores, wherein the time dilation is based on a knowledge domain associated with the skill score and accounts for skill degradation over time by decreasing the identified individual's skill score from the point of last interaction with the one or more determined work items to the present time;
cause display the one or more individuals' possessing skills scores, wherein the score is calculated based on a current number of skill occurrences for the individual minus a mean value, over three times a square root of one over a number of the individuals that possess the skill or keyword times a sum of a squared value of the current number of skill occurrences for the individual minus a mean value, plus one, times a heuristic value, times the current number of skill occurrences for the individual over a total number of skill occurrences across all of the one or more individuals, times an adjusted calculated score according to an influence of time dilation; and
automatically decrease each of the identified individual's generated skill scores in the traversable graph based on the combination of a heuristic value associated with the skill and the specified type of time dilation.

8. The system of claim 7, wherein the instructions, which when executed by the processor, cause the processor to:
receive a search term from a user interface;
generate a search query based on the received search term; and
provide a result to the user interface based on the search query, wherein the result includes the skill score associated with one or more of the plurality of individuals.

9. A computer-implemented method for performing operations on a graphical user interface, comprising:
determining, by a processor, information in a content source;
converting the information into a structured format;
applying one or more classifiers to the information in the structured format, the one or more classifiers corresponding to a work item associated with a skill;
associating an individual with the classifier based on the individual having created, edited, reviewed, or approved the work item corresponding to the classifier;
generating a skill score for the individual based on the individual having created, edited, reviewed, or approved the work item associated with the classifier;
storing the skill score associated with the individual, each individual of the one or more individuals, and each skill in a traversable graph, the traversable graph linking the individual to the skill based on the skill score;
providing the skill score associated with the individual to a graphical user interface of a display device;
specifying a type of time dilation for each of the identified individual's generated skill scores, wherein the time dilation is based on a knowledge domain associated with the skill score and accounts for skill degradation over time by decreasing the identified individual's skill score from the point of last interaction with the one or more determined work items to the present time;
cause display the one or more individuals' possessing skills scores, wherein the score is calculated based on a current number of skill occurrences for the individual minus a mean value, over three times a square root of one over a number of the individuals that possess the skill or keyword times a sum of a squared value of the current number of skill occurrences for the individual minus a mean value, plus one, times a heuristic value, times the current number of skill occurrences for the individual over a total number of skill occurrences across all of the one or more individuals, times an adjusted calculated score according to an influence of time dilation; and
automatically decreasing each of the identified individual's generated skill scores in the traversable graph based on the combination of a heuristic value associated with the skill and the specified type of time dilation.

10. The computer-implemented method of claim 9, wherein the skill score is based on a summation of the number of instances in which the individual is associated with the skill and a normalization of the summation over the other individuals having skill scores for the skill.

11. The computer-implemented method of claim 10, further comprising:
receiving a search term from the user interface;
generating a search query based on the received search term; and
returning the skill score associated with the individual as a search result; and
providing the search result to the user interface of the display device.

12. The computer-implemented method of claim 10, wherein the content source is a version control repository for software and the received information is at least one of a pull request or commit associated with the version control repository for software.

\* \* \* \* \*